United States Patent
Zhang et al.

(10) Patent No.: US 8,175,150 B1
(45) Date of Patent: May 8, 2012

(54) METHODS AND/OR APPARATUS FOR IMPLEMENTING RATE DISTORTION OPTIMIZATION IN VIDEO COMPRESSION

(75) Inventors: Rui Zhang, Pleasanton, CA (US); Guy Cote, San Jose, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1364 days.

(21) Appl. No.: 11/750,644

(22) Filed: May 18, 2007

(51) Int. Cl.
   *H04N 7/30* (2006.01)
(52) U.S. Cl. ............... 375/240.08; 375/240; 375/240.02
(58) Field of Classification Search .................. None
   See application file for complete search history.

(56) References Cited

U.S. PATENT DOCUMENTS

| | | | |
|---|---|---|---|
| 6,490,320 B1* | 12/2002 | Vetro et al. | 375/240.08 |
| 6,507,616 B1* | 1/2003 | Ryu | 375/240.13 |
| 7,715,475 B1* | 5/2010 | Puri et al. | 375/240 |
| 2004/0131121 A1* | 7/2004 | Dumitras et al. | 375/240.16 |
| 2005/0226335 A1* | 10/2005 | Lee et al. | 375/240.16 |
| 2005/0286628 A1* | 12/2005 | Drezner | 375/240.2 |
| 2006/0039470 A1* | 2/2006 | Kim et al. | 375/240.16 |
| 2007/0274396 A1* | 11/2007 | Zhang et al. | 375/240.24 |
| 2008/0181311 A1* | 7/2008 | Zhang et al. | 375/240.24 |

* cited by examiner

*Primary Examiner* — Ponnoreay Pich
(74) *Attorney, Agent, or Firm* — North Weber & Baugh LLP

(57) ABSTRACT

An apparatus comprising a first circuit, a second circuit and a third circuit. The first circuit may be configured to determine one or more signal characteristics in a portion of an input video signal. The second circuit may be configured to select a multiplier value from a plurality of multiplier values in response to the signal characteristics. The third circuit may be configured to generate an encoded bitstream in response to (i) the input video signal and (ii) the selected multiplier value.

23 Claims, 3 Drawing Sheets

METHODS AND/OR APPARATUS FOR IMPLEMENTING RATE DISTORTION OPTIMIZATION IN VIDEO COMPRESSION

CROSS REFERENCE TO RELATED APPLICATIONS

The present application may relate to co-pending application Ser. No. 11/249,213, filed Oct. 13, 2005, Ser. No. 11/250, 102, filed Oct. 13, 2005, and Ser. No. 11/250,109, filed Oct. 13, 2005, which are each hereby incorporated by reference in their entirety.

FIELD OF THE INVENTION

The present invention relates to video processing generally and, more particularly, to a method and/or architecture for implementing rate distortion optimization in a video compression system.

BACKGROUND OF THE INVENTION

Rate-distortion (RD) theory is a fundamental theory for compression. Rate distortion based techniques have started to be exploited in practical video coding systems in recent years. Usually the constrained optimization problem is transferred into unconstrained problem through a lagrangian method. Therefore, the selection of a lagrangian multiplier becomes a critical issue relating to video quality.

According to information theory, the lagrangian multiplier corresponds to the negative slope of the rate distortion (R-D) curve of the input signal processed with the coding system. In practice, both the signal characteristics and the coding system settings will affect this operational R-D behavior. On the one hand, video signals are complex and dynamic. No single mathematical model can describe all the scenes, and different signal characteristics, such as spatial frequency and temporal motion will lead to different R-D behaviors. Meanwhile, the human visual system (HVS) is more sensitive to some feature areas than to others. The lagrangian multiplier should be selected adaptively to those input signal features and to the characteristics of the human visual system. On the other hand, the R-D curve is the operational behavior of a particular coding system, rather than a theoretical boundary. The parameter settings of the coding control will affect the rate distortion behavior of the input signal. For example, the same content coded under intra mode and inter mode will result in different R-D curves.

Conventional R-D based techniques do not take into account input signal characteristics (i.e., all input signals are treated equally). Furthermore, coding parameters considered for the R-D curve are not sufficient, since only some simple assumptions between the lagrangian multiplier and coding schemes such as picture type, and/or reference picture distance have been considered.

It would be desirable to implement a rate distortion optimization system that adapts to features of varying video signals as well as features of different coding parameters.

SUMMARY OF THE INVENTION

The present invention concerns an apparatus comprising a first circuit, a second circuit and a third circuit. The first circuit may be configured to determine one or more signal characteristics in a portion of an input video signal. The second circuit may be configured to select a multiplier value from a plurality of multiplier values in response to the signal characteristics. The third circuit may be configured to generate an encoded bitstream in response to (i) the input video signal and (ii) the selected multiplier value.

The objects, features and advantages of the present invention include providing a method and/or apparatus for implementing rate distortion optimization in video compression that may (i) adapt to behavior features of a video signal and/or (ii) adapt to different coding system settings for different portions of the video signal.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
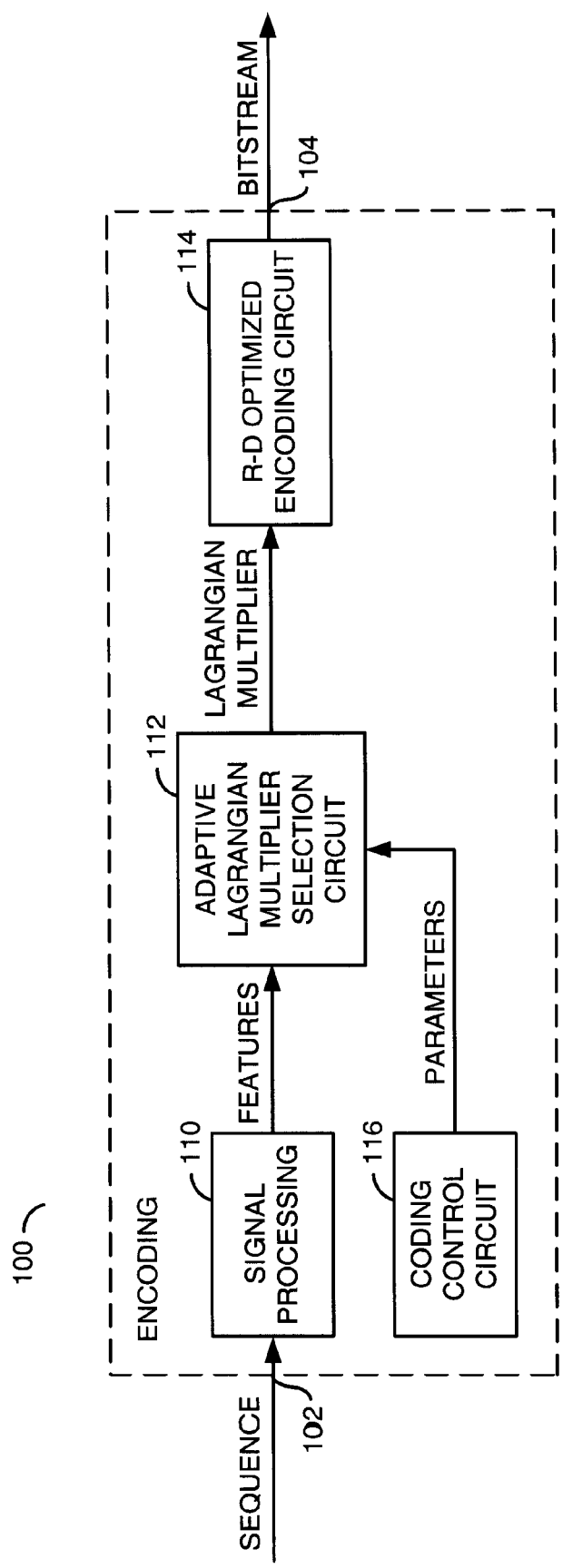
FIG. 1 is a block diagram of an encoding portion of the present invention.

Referring to FIG. 1, a block diagram of a circuit 100 is shown in accordance with a preferred embodiment of the present invention. In one example, the circuit 100 may be implemented as an encoder. The circuit 100 may have an input 102 that may receive a signal (e.g., SEQUENCE) and an output 104 that may present a signal (e.g., BITSTREAM). The signal SEQUENCE may be a video input signal in uncompressed form. The signal BITSTREAM may be an encoded digital video signal in compressed form. The signal BITSTREAM may comprise a series of frames. Each of the frames may comprise a number of macroblocks. Each of the macroblocks may comprise a number of pixels. The circuit 100 generally comprises a block (or circuit) 110, a block (or circuit) 112, a block (or circuit) 114 and a block (or circuit) 116. In one example, the circuit 110 may be implemented as a signal processing block. In one example, the circuit 112 may be implemented as an adaptive lagrangian multiplier selection circuit. In one example, the circuit 114 may be implemented as a R-D optimized encoding circuit. In one example, the circuit 116 may be implemented as a coding control circuit.

The multiplier selection circuit 112 may be used to adapt a lagrangian multiplier used by the encoding circuit 114 to the particular characteristics of the signal SEQUENCE and the coding control parameters. The signal characteristics of the signal SEQUENCE are analyzed on a per macroblock basis. Each macroblock may be classified according to a dominant feature. A specific lagrangian multiplier is then selected based on the dominant feature and/or the coding mode used. Different features (and coding modes) normally have different optimal lagrangian multiplier values, so the multiplier selection circuit 112 adapts to the particular situation present on the signal SEQUENCE. There is no direct mathematical formula for calculating a relationship between the features of the signal SEQUENCE and the optimal lagrangian multipliers. The multiplier selection circuit 112 may select one of a number of pre-defined values that may be stored (e.g., in a look up table). The stored values may be calculated through an offline training process (to be described in more detail in connection with FIG. 3) to achieve an overall maximum picture quality.

A mathematical model between the lagrangian multiplier and the signal characteristics/coding parameters for the optimal R-D operational curves is not readily available. A pre-defined look up table in the multiplier selection circuit 112 may be used to select a lagrangian multiplier according to the signal characteristics and/or coding parameters of the signal SEQUENCE. The look up table may be optimized offline allowing an online search to be made quickly and easily to be used for the practical encoding process. The following TABLE 1 illustrates an example of a look up table:

TABLE 1

| Dominant Feature Index | Coding Parameter Index | Table Entry | Lagrangian Multiplier Value |
|---|---|---|---|
| Feature 1 | Parameter set 1 | 1 | L(1) |
| Feature 1 | Parameter set 2 | 2 | L(2) |
| Feature 1 | ... | ... | ... |
| Feature 1 | Parameter set M | M | L(M) |
| ... | ... | ... | ... |
| Feature N | Parameter set 1 | (N − 1) xM + 1 | L((N − 1) xM + 1) |
| Feature N | Parameter set 2 | (N − 1) xM + 2 | L((N − 1) xM + 2) |
| Feature N | ... | ... | ... |
| Feature N | Parameter set M | NM | L(NM) |

Note that the table entry size is the product of the feature size and the coding parameter set size. For example, if there are N dominant features and M coding parameter sets, there will be a total of NM lagrangian multiplier entries. The examples of M and N are shown for illustrative purposes. The particular multipliers implemented may be varied to meet the design criteria of a particular application.

Figure 2:
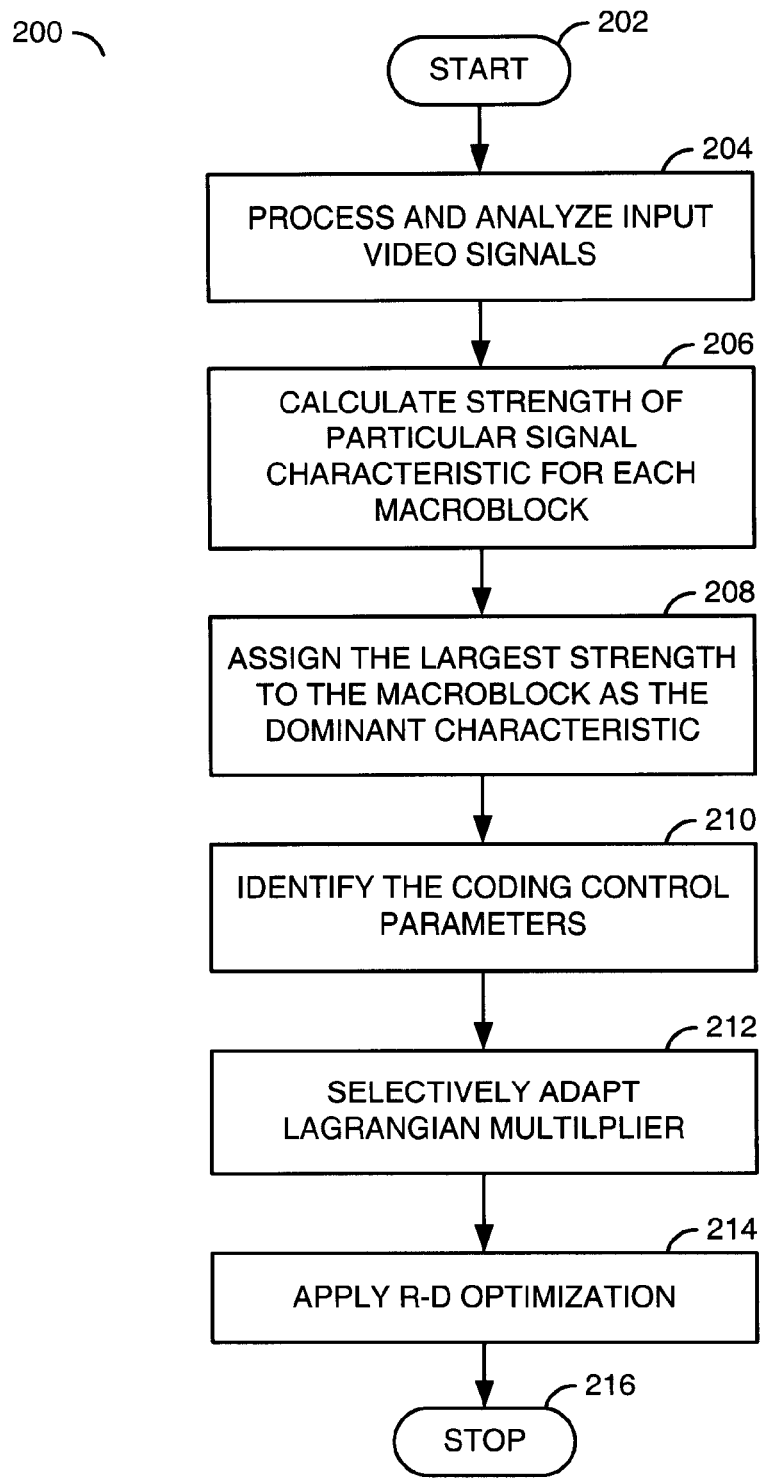
FIG. 2 is a flow diagram of the present invention.

Referring to FIG. 2, a diagram of a method (or process) 200 is shown. The method 200 generally comprises a state 202, a state 204, a state 206, a state 208, a state 210, a state 212, a state 214, and a state 216. The state 202 may be a start state. The state 204 may process and analyze an input video signal. The state 206 may calculate the strength of a particular signal characteristic for each macroblock. The state 208 may assign the largest strength to the macroblock as the dominant characteristic (e.g., the value N in TABLE 1). The state 210 may identify the coding control parameters (e.g., the value M in TABLE 1). The state 212 may selectively adapt a lagrangian multiplier. The state 214 may apply R-D optimization. The state 216 may be a stop state.

Figure 3:
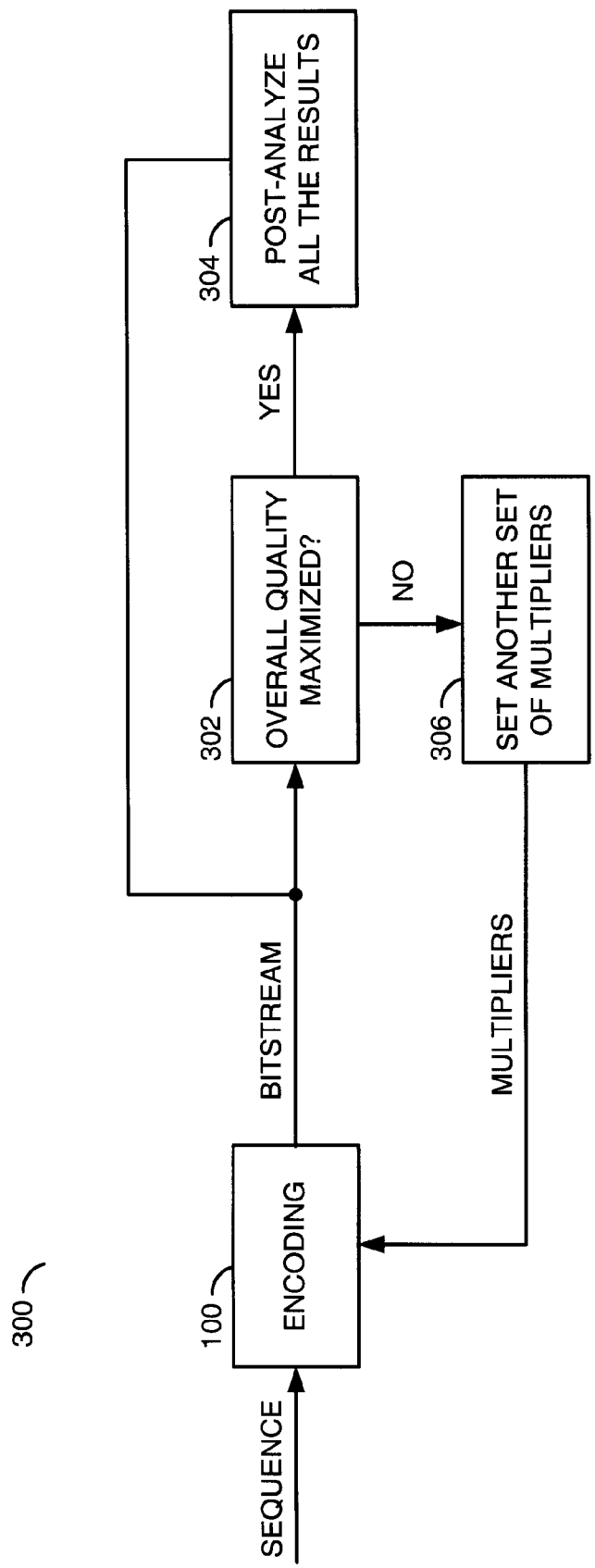
FIG. 3 is a diagram illustrating an offline training process for the present invention.

Referring to FIG. 3, a diagram of an offline training system 300 is shown including the circuit 100. The system 300 generally comprises the circuit 100, a block (or circuit) 302, a block (or circuit) 304 and a block (or circuit) 306. The circuit 302 may be a decision circuit that determines if the overall quality of the signal BITSTREAM has been maximized. If so, the circuit 304 performs post analysis of all of the results. If the circuit 302 determines that the overall quality has not been maximized, then the circuit 306 sets another set of multipliers and the encoder 100 re-encodes the signal BITSTREAM. The system 300 may be used to implement an offline training process (as described in connection with FIG. 2). The offline training may be used during a training and/or design period, prior to actual encoding to obtain the values that are used in the look up table illustrated in TABLE 1. On subsequent online encoding, values from the look up table are used to select an optimized lagrangian multiplier by the circuit 112.

The present invention may be used to exploit different R-D behaviors for different video signal features and/or for different coding parameters utilized. A lagrangian multiplier is selected adaptively to make the coding system work at the optimal point for the input signal, achieving the best video quality for the given bit budget.

While training based on lagrangian multipliers for particular coding features has been described, training may also be based the classification of the macroblocks. For example, each feature region may be based on a particular feature, such as high frequency content, motion, color, edge information, etc. Each feature may be combined and mixed (e.g., the amount of high frequency information, the amount of motion, etc.) and selected per feature region. The macroblock classification may be stored in the look up table as a separate value that may be selected similarly to the selection of the lagrangian multiplier. The training method may incorporate and store the definition for each feature region. The feature region training may be implemented along with the training for the coding multiplier or as an independent training step.

First, the video signal SEQUENCE is processed and analyzed. Each macroblock is then classified according to a particular signal characteristic. Examples of such characteristics may be low/high spatial frequency, fast/slow temporal motion etc. Each macroblock may be identified as being strong or weak for the above features. Since each macroblock may have more than one feature present, the strength of each feature may be a separate calculation. The feature that has the largest strength is assigned to each macroblock as the dominant feature for the particular macroblock. The macroblocks that have the same dominant feature may be grouped as a feature region. Each feature region may be used to represent similar input signal characteristics and thus share the same set of rules for selecting the lagrangian multiplier. Each macroblock normally comprises a plurality of pixels. The particular number of pixels in each macroblock may be varied to meet the design criteria of a particular implementation.

After analyzing the signal SEQUENCE, the coding control parameters are identified. Coding control parameters may include the current slice type, whether or not a slice will be used as a reference, the coding mode (e.g., intra, inter, skip, etc.), and/or the prediction mode (e.g., uni-directional, bi-directional, etc.), etc. The lagrangian multiplier may then be selected adaptively based on the dominant feature of each macroblock under the particular coding tool utilized (or based on the dominant characteristic of a particular feature region), and/or the feature of particular coding parameters. The particular R-D optimization may then be applied.

The model between the lagrangian multiplier and the signal characteristics/coding parameters for the optimal R-D operational curves may be built up through offline training and stored in the look up table. The training process normally obtains sufficient and effective operational points for the input signals and the coding system, and then derives the operational R-D curve for each feature region/coding tools pair. The typical sequences in the training set are first analyzed with signal processing tools. Strengths for each defined feature regions are recorded for each picture and each macroblock. The sequences are then encoded with some pre-defined lagrangian multiplier set based on coding parameters. In order to collect sufficient and effective operational points of the coding system, many sets of such lagrangian multiplier sets need to be evaluated. There are different ways to define those sets. One efficient way is to set an initial parameter set and jump to other parameter sets through the nelder-mead search method by maximizing the overall sequence quality, as shown in FIG. 3. All the coding results are then collected, and the distortion for each dominant feature region, as well as for the pictures, are calculated and thoroughly analyzed to derive the optimal operational model and the corresponding lagrangian multiplier. Both the objective distortion measure and the subjective quality evaluation are used to derive those models.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to determine one or more signal characteristics in a portion of an input video signal;
a second circuit configured to select a multiplier value from a plurality of multiplier values in response to said signal characteristics, wherein the multiplier value controls operational rate and distortion behavior of the portion of the input video signal; and
a third circuit configured to generate an encoded bitstream in response to (i) said input video signal and (ii) said selected multiplier value.

2. The apparatus according to claim 1, wherein said multiplier values comprise Lagrangian multipliers.

3. The apparatus according to claim 1, wherein said signal characteristics comprise features relating to pictures in said input video signal.

4. The apparatus according to claim 1, wherein said signal characteristics comprise features relating to various coding parameters used to encode said bitstream.

5. The apparatus according to claim 1, wherein said portion of said input video signal comprises a macroblock.

6. The apparatus according to claim 5, wherein a plurality of macroblocks having similar signal characteristics are grouped and processed together as a feature group.

7. A method for encoding a video signal, comprising the steps:
(A) determining one or more signal characteristics in a macroblock of said video signal;
(B) determining a dominant signal characteristic of said macroblock; and
(C) selecting a multiplier value from a plurality of multiplier values in response to said dominant signal characteristic, wherein said multiplier value controls operational rate and distortion behavior of the portion of the input video signal and is used to generate an encoded bitstream.

8. The method according to claim 7, further comprising forming a featured region by (i) repeating steps (A) and (B) for a subsequent number of macroblocks and (ii) creating said featured region comprising group of said macroblocks having a dominant characteristics.

9. The method according to claim 7, wherein said multiplier values comprises Lagrangian multipliers.

10. The method according to claim 7, wherein said plurality of multiplier values are generated using an offline training process.

11. The method according to claim 10, wherein said offline training comprises the steps of:
determining if said encoded bitstream has a first state indicating a maximum quality or a second state indicating additional processing is needed; and
adjusting said multiplier values when said bitstream has said second state prior to re-encoding said video signal, wherein said multiplier values are stored in a look up table when said maximum quality has been obtained.

12. The method according to claim 10, wherein said offline training comprises the steps of:
forming a featured region by (i) repeating steps (A) and (B) for a subsequent number of macroblocks and (ii) creating said featured region comprising group of said macroblocks having a dominant characteristics; and
selecting a feature region definition value from a plurality of feature region definition values in response to said dominant signal characteristic, wherein said feature region definition value is used to generate said encoded bitstream.

13. The method according to claim 12, wherein said selection of said feature region definition value is based on one of more of features selected from the group consisting of high frequency content, motion, color, and edge information.

14. The method according to claim 12, wherein (i) said feature region definition value and (ii) said multiplier value are selected independently.

15. The method according to claim 12, wherein (i) said feature region definition value and (ii) said multiplier value are selected concurrently.

16. An apparatus comprising:
a first circuit configured to generate an encoded bitstream in response to (i) a video input signal and (ii) one or more multiplier values;
a second circuit configured to determine if said encoded bitstream has a first state indicating a maximum quality or a second state indicating additional processing is needed;
a third circuit configured to adjust said one or more multiplier values when said bitstream has said second state prior to said first circuit re-encoding said video signal, wherein said third circuit stores said one or more multiplier values in a look up table when said maximum quality has been obtained.

17. The apparatus according to claim 16, wherein said apparatus comprises a rate distortion optimization system.

18. The apparatus according to claim 16, wherein said third circuit stores a plurality of multiplier values with each of said values corresponding to a particular characteristic of a portion of said video input signal.

19. The system according to claim 16, wherein said system further comprises:
a fourth circuit configured to provide post-analysis of said encoded bitstream.

20. The apparatus according to claim 19, wherein said fourth circuit provides analysis of spatial frequencies.

21. The apparatus according to claim 19, wherein said fourth circuit provides analysis of temporal motion.

22. The apparatus according to claim 21, wherein analysis comprises spatial frequency analysis is provided on a per macroblock basis.

23. The apparatus according to claim 22, wherein (i) said bitstream comprises a series of frames, (ii) each of said frames comprises a plurality of macroblocks, and (iii) said temporal motion analysis is provided on a per macroblock basis.

* * * * *